Oct. 17, 1944.   F. O. HICKLING   2,360,419
CAGE FOR USE IN BALL BEARINGS
Original Filed March 27, 1942

INVENTOR
Frederick O. Hickling
BY
ATTORNEY

Patented Oct. 17, 1944

2,360,419

UNITED STATES PATENT OFFICE 2,360,419

CAGE FOR USE IN BALL BEARINGS

Frederick Osgood Hickling, West Bridgford, Nottingham, England, assignor to Ransome and Marles Bearing Company, Limited, Newark-on-Trent, England, a British company Original application March 27, 1942, Serial No. 436,523. Divided and this application November 21, 1942, Serial No. 466,434. In Great Britain August 6, 1940

4 Claims. (Cl. 308—201)

This invention relates to improvements in cages for use in single or double row ball bearings of any of the usual types either with or without a filling notch and more particularly to improvements in one piece cages, the construction being such that a more efficient cage can be provided at a cheaper cost.

Hitherto in one piece cages the location of the cage in the bearing laterally has always been effected on the balls, but the chief object of the present invention is to provide a cage of simple design which can be located and held laterally in the bearing in an improved manner.

A further object is to provide a one-piece cage preferably of solid and robust construction in which prongs or fingers are so arranged as to retain the cage against lateral movement.

With these and other objects in view the invention consists in forming or providing a cage with means whereby it can be located laterally in the bearing and held in one direction against the balls and in the opposite direction against the side wall of the track.

The invention further consists in forming a cage with recesses or slots to engage the balls and with intermediately arranged fingers or prongs adapted to engage against the side of one of the ball tracks so that the cage will be retained laterally in opposite directions.

This application is a division of application for Letters Patent Serial No. 436,523 filed March 27, 1942.

The invention will now be described with reference to the accompanying drawing, in which.

Figure 1:
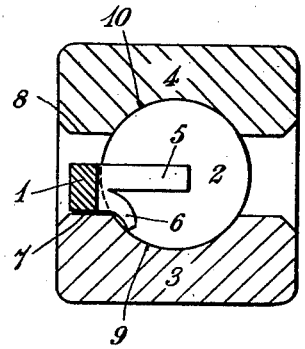
Figure 1 is a section showing one form of cage disposed in the rings of a ball bearing.
Figure 2:
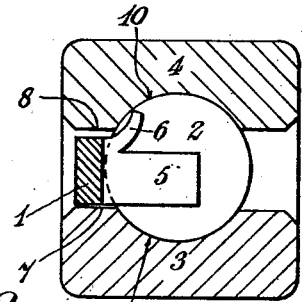
Figure 2 is a similar view to Figure 1 showing a modified form of cage.

According to one form of this invention and as shown more particularly in Figures 1 and 2 a cage 1 for balls 2 in a ball bearing consisting of inner and outer rings 3 and 4 respectively is in the form of a metal sleeve provided with a plurality of slots or recesses each of a width substantially equal to the diameter of the ball 2 and the material 5 between the recesses is formed with prongs or fingers 6. These prongs or fingers 6 are formed by cutting and bending out a portion of each projection 5 so that the prongs or fingers 6 lie adjacent to the side wall of the ball track and extend inwardly thereof. Thus the projections 5 are of such thickness as to engage and space the balls 2 above and below their pitch circle and the fingers or prongs 6 have their root adjacent to the main portion of the cage 1 lying between the shoulders 7 and 8 of the inner and outer rings 3 and 4 of the bearing respectively. The prongs or fingers 6 are preferably formed by undercutting each ball spacing projection 5 so that on assembly the tapered prongs 6 can be conveniently bent over from the other side of the bearing by a suitable punch and pressure to engage with the side wall of the track.

The slots or recesses are preferably formed with parallel side faces and a flat base with rounded corners so that each slot or recess is of substantially flat U shape. The bottoms of the slots are adapted to butt against the ball 2 and the prongs or fingers 6 are adapted to butt against the side wall of the ball track 9 formed in the inner ring 3 in the construction shown in Figure 1 and against the side of the ball track 10 in the construction shown in Figure 2. Thus the location of the cage 1 in one direction is against the balls 2 but in the opposite direction against the side wall of the track.

The main portion of the cage 1 may be of such diameter so as to seat either on the side face or shoulder 7 adjacent to the ball track 9 of the inner ring 3 as shown in Figure 1 or on the side face or shoulder 8 of the outer ring 4. In the construction shown in Figure 2 the thickness of the cage is substantially equal to the space between the shoulders 7 and 8 of the bearing rings 3 and 4 respectively.

In fitting up bearings as above described the requisite number of balls 2 is assembled into the track 9 and 10 of the bearing rings 3 and 4 by the usual method and the balls are spaced equally around the tracks in the usual way. The cage 1 is then placed between the rings 3 and 4 and pressure is applied from the opposite side of the bearing so that the prongs or fingers 6 engage against the side wall of either the inner or outer track according to the particular construction of the cage.

Thus assembly time is reduced to a minimum and cleanliness of the operation is infinitely improved particularly when compared with two piece cages which are fitted by means of rivets or other means.

Figure 3:
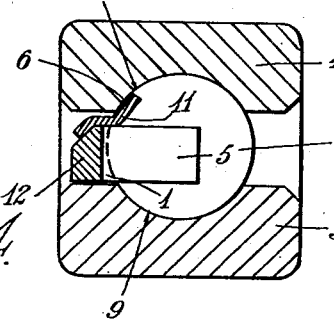
Figure 3 is a cross section of the rings of a ball bearing showing a cage having a ring-like plate to provide fingers to engage the side wall of the track.

In a further modified construction as shown in Figure 3 the prongs or fingers 6 may be formed in a separate ring-like plate 11 preferably of a resilient character arranged and secured in any suitable manner on the ring portion 12 of the cage 1 formed with the ball spacing projections 5. This construction would be particularly suitable and applicable to non-metallic cages. The fingers 6 of the ring-like plate 11 which would preferably be of metal may be of spring like character so that the cage can be so inserted into one side of the bearing that the fingers 6 will spring back to engage against the side wall of the track or bent over by a tool from the other side of the bearing as hereinbefore described.

Figure 4:
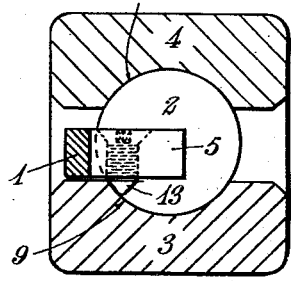
Figure 4 is a similar view showing a cage in which the fingers are in the form of screws.
Figure 5:
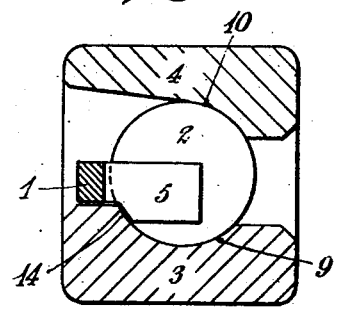
Figure 5 is a similar view showing a cage of still more solid construction.

In a still further modified construction the prongs or fingers may be in the form of screws 13 threaded into the projections 5 as shown in Figure 4 or in the form of pegs to engage with the side wall of one of the tracks on which the row of balls are adapted to seat and revolve in the usual manner. The screws or pegs would conveniently be fitted or finally adjusted after the cage has been assembled into the bearing. Alternatively, the cage 1 may be held laterally by means of a notch 14 on each projection 5 to engage against the side of the ball track as shown in Figure 5 the notches being formed by increasing the thickness of the ball spacing projections 5. In this case the cage 1 is passed over one shoulder of, for instance, the inner ring 3 which is reduced in diameter and then the balls 2 are assembled, the outer ring 4 being afterwards placed in position conveniently by heat and pressure in the usual manner.

Figure 6:
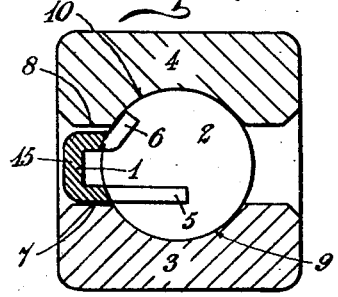
Figures 6 and 7 are similar views to Figure 1 showing two further modified constructions.
Figure 7:
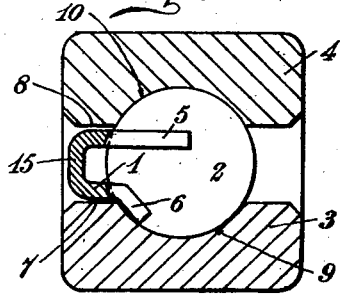

In further modifications as shown in Figures 6 and 7 the main portion of each cage 1 is of channel or U shape as indicated at 15 to lie between the shoulders 7 and 8 of the inner and outer rings 3 and 4 of the bearing respectively and adjacent to the tracks so that the projections 5 extend beyond the pitch centre of the balls 2 and either inwardly or outwardly of the said centre, the prongs 6 being bent to engage the side of the track of the outer ring 4 or the inner ring 3 respectively.

It will be seen from the above that in all cases the cage is located laterally in one direction against the balls and in the opposite direction against the track. When in service the cage allows a much greater grease or lubrication space around the balls and thus the serviceability is greatly improved. Obviously the cages above described may be used in all types of single or double row ball bearings either of the non-filling slot type or filling slot type, double purpose type or cup and cone type.

What I claim is:

1. A cage for use in ball bearings of the type including an inner race, an outer race, and cooperating balls cooperating with said races, said cage including an annular member to fit between the races beyond the balls, spaced projections extending in one direction from the annular member and fitting between the balls with point contact, with the balls at substantially the major diameter thereof, and fingers divided from the projections with their free ends at the free ends of the projections and their roots adjacent the annular member, said fingers being bendable relative to the projections and of a length to permit their free ends when the fingers are bent to abut a race and alone serve to prevent movement of the cage in one separating direction relative to the bearing.

2. A cage for use in ball bearings of the type including an inner race, an outer race, and cooperating balls cooperating with said races, said cage including an annular member having point contact with the balls when in position in the bearing and acting to provide cage holding influence against movement in one direction relative to the bearing, projections extending in spaced parallel relation from the member to fit between and space the balls, and fingers divided from the projections and independently bendable relative to the projections toward the annular member, the bendable lengths of the fingers providing that the free ends of the fingers will reach and engage the inner surface of a race to provide cage holding influence relative to the bearing in a direction opposite the cage holding influence of the annular member.

3. A cage for use in ball bearings of the type including an inner race, an outer race, and cooperating balls cooperating with said races, said cage including space projections to be inserted between and have substantially point contact only with the balls, and means whereby the cage is held against movement relative to the bearing in either of opposite directions relative to the balls, said means including an annular member to bear against the balls in the direction of cage insertion and supporting and positioning the projections, and elements divided from the projections and free of the latter for a distance from the free ends of the projections toward the annular member, said elements being bendable at will to move their free ends toward the annular member to dispose such free ends in contact with a race to limit movement of the cage in a direction opposing that movement prevented by the annular member.

4. A cage for ball bearings, including an annular member, a series of ball-spacing parallel projections extending in one direction from the member, certain of the projections being divided from their free ends toward but terminating short of the annular member to provide fingers freely bendable away from the free ends of the projections toward the annular member, the annular member and free ends of the fingers providing opposite movement limiting members for the cage in use.

FREDERICK OSGOOD HICKLING.